Oct. 19, 1954   H. G. HUNTER   2,692,142
APPARATUS FOR DISTRIBUTING SAND OR THE LIKE
Filed April 6, 1950   2 Sheets-Sheet 2

INVENTOR
HENRY G. HUNTER
BY Mock & Blum
ATTORNEYS

Patented Oct. 19, 1954

2,692,142

UNITED STATES PATENT OFFICE 2,692,142

APPARATUS FOR DISTRIBUTING SAND OR THE LIKE

Henry G. Hunter, Potsdam, N. Y.

Application April 6, 1950, Serial No. 154,410

4 Claims. (Cl. 275—2)

My invention relates to new and improved apparatus and a new and improved method for distributing sand or other powdered material. In particular, the invention relates to distributing sand from a moving vehicle. This moving vehicle may be of any type, such as a self-propelled vehicle or a pull-vehicle of the trailer type.

According to my invention, I provide simple and efficient mechanism for producing a uniform distribution of the sand or other powdered material upon a road or sidewalk or other area. According to my invention, I greatly economize the time and labor which are required for putting sand on sidewalks, roadways and other areas where the anti-skid protection of sand is required.

According to one embodiment of my invention, I mount the device on a vehicle. For convenience, the direction of movement of the vehicle is designated as the longitudinal direction. Of course, the vehicle may be steered or guided to move in a curved path. A receptacle or hopper is turnably connected to the frame of said vehicle. This hopper is turnable about a lateral axis. Said hopper has an open bottom, which has side longitudinal edges, and front and rear lateral edges. This hopper can be oscillated, so that its vertical axis is alternately forwardly and rearwardly inclined. This hopper can also be vertically adjusted. An obstruction-plate or valve-plate, which is optionally and preferably imperforate, is fixed to the frame of the vehicle below said open bottom. This plate applies a blocking force on said material which is opposed to gravity, so that the material cannot flow directly downwardly from said open bottom.

Said hopper can be vertically adjusted until the edges of its open bottom abut or are vertically very close to said obstruction-plate. This is designated as the non-dispensing position of the hopper. In such position, the edges of the open bottom are vertically alined with said obstruction-plate, and the edges of said open bottom are located inwardly of the edges of the obstruction-plate. If there is a slight vertical space between the edges of the open bottom and the obstruction plate, the static friction between the particles or pieces of the sand or other flowable solid material prevents the flow of said material out of the hopper, while the vehicle is being moved.

In order to deliver the powdered or other flowable solid material from the hopper, said hopper is raised relative to said obstruction-plate to a dispensing position of the hopper. Optionally and preferably, when the hopper is in said dispensing position, the edges of the open bottom of the hopper are vertically alined with the obstruction-plate; and said edges of the hopper are located inwardly of the edges of the obstruction plate; and the vertical spacing between the edges of the bottom and the obstruction-plate is so small that the static friction between the particles of sand or other material wholly or substantially prevents the flow of said material out of the hopper under the force of gravity, or under the agitation which is produced by the movement of the vehicle.

While the vehicle is moved and the hopper is in its dispensing position, the hopper is oscillated about its lateral axis of turning movement. When the open bottom of the hopper is in either its extreme forward or rearward position during said oscillation, the edges of said open bottom are vertically alined with the obstruction plate and located inwardly of the edges of the obstruction plate. The oscillation of the hopper exerts sufficient ejecting force on the sand or other material, so as to eject the material in alternate front and rear streams which flow over the front and rear lateral edges of the obstruction plate. Means are provided for preventing the material from flowing over the longitudinal side edges of the obstruction-plate. As one factor, the volume of each ejected stream depends on the adjusted vertical spacing of the bottom of the hopper from the obstruction plate.

The hopper is oscillated at a respective adjusted period, which may bear a constant relation to the speed of movement of the vehicle, so that the period of oscillation of the hopper is diminished when the speed of the vehicle is increased, and vice versa. Thus, if the vehicle is moved at a speed of ten miles per hour, the hopper will have ten times as many oscillations per minute, than when the vehicle is moved at a speed of one mile per hour. I thus increase the number of ejected streams per minute as the speed of the vehicle is increased, so that the volume of the ejected material is the same per unit of the area over which the vehicle is moved.

While I do not exclude some dispensing of the powdered material under the force of gravity or by reason of the vibration which results from the movement of the vehicle, I prefer to control at least a major part of the dispensing of the material, and preferably 90% or more of said dispensing, solely by the controlled oscillation of the hopper.

Other objects and advantages and features of my invention are set forth in the annexed description and drawings, which illustrate a preferred embodiment of the mechanism thereof.

Figure 3:
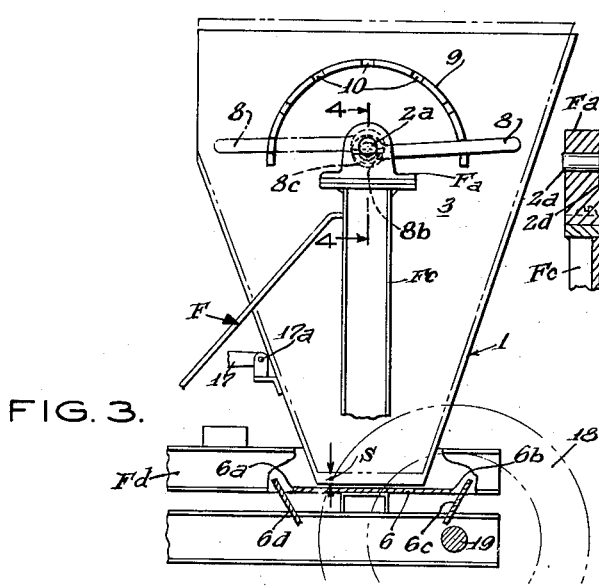
Figure 4:
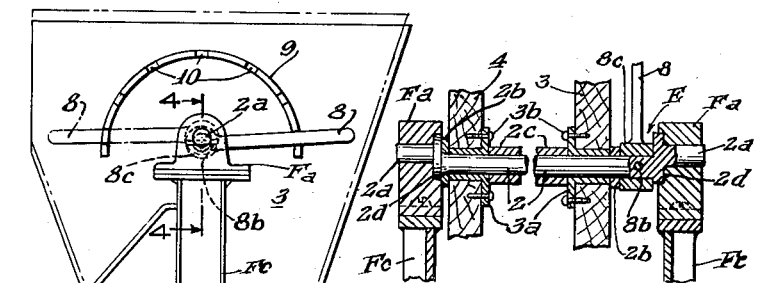

Fig. 3 is an end elevation. The full-line position of the hopper corresponds to its non-dispensing position of Fig. 1. The broken-line position of the hopper shows how the hopper has been vertically adjusted to its maximum height; and, Fig. 4 is a section on the line 4—4 of Fig. 3.

In this example, I have shown the invention applied to a trailer vehicle.

Said trailer has two supporting wheels 18, which are fixed to a lateral axle or shaft 19 which is mounted turnably in the chassis of the trailer, so that the shaft or axle 19 is rotated when the trailer is pulled. A frame F is fixed to said chassis. Said frame F has a socket Fb at its front end, whereby said frame F can be connected to a pulling vehicle.

The receptacle or hopper 1 has parallel and longitudinal and vertical side walls 3 and 4. A longitudinal bearing bar 5 is fixed to the inner surface of each side wall 3 and 4. A rod or shaft 2 has end-portions 2a. The end-portions 2a have a common axis which is parallel to the axis of the rod or shaft 2. The common axis of the end-portions 2a is offset relative to the axis of the rod or shaft 2. At each end, the shaft 2 extends through a sleeve 3a, of the respective bar 5, which has an inner face which is fixed by fastening members 3b to the respective longitudinal wall 3 or 4. Intermediate the sleeves 3a, a sleeve 2c is provided on the rod or shaft 2. This sleeve 2c acts as a spacer. The sleeve 2c is freely turnable relative to the shaft 2. The hopper 1 is freely turnable relative to the rod or shaft 2. Externally of the side walls 3 and 4, a spacer ring 2b is provided at each end of the shaft 2. Each spacer ring 2b is freely turnable relative to the rod or shaft 2. The offset end-portions 2a of the shaft 2 are turnably mounted in respective bearings Fa which are fixed to the members Fc of the frame F. At the inner face of each bearing Fa, the shaft 2—2a is provided with an enlarged disc-shaped flange 2d which is mounted turnably in the respective bearing Fa.

At the wall 3, a collar 8c is fixed to the shaft 2 by means of the pin 8b. This collar 8c is integral with an arm 8. The respective spacer ring 2b at wall 3 thus provides an end-thrust bearing between the wall 3 and the collar 8c. At the other end of the shaft 2, where the collar 8c is omitted, the ring 2b is of sufficient width to abut the respective longitudinal wall 4 and the respective flange 2d.

I thus provide a crank or adjusting device E, for adjusting the height of the hopper 1.

When the arm 8 is in its full-line position of Fig. 3, which corresponds to its position of Fig. 4, the axis of the rod or shaft 2 is in the same vertical plane as the common axis of the bearing end-portions 2a, and the vertical distance between the axis of the shaft 2 and the common axis of the end-portions 2a is a maximum. The hopper 1 is then in its bottom full-line position of Fig. 1 and Fig. 3, in which the edges of the open bottom of the hopper 1 either abut the plate 6 or are sufficiently close to the plate 6 to prevent the flow of material M out of the hopper 1. As shown in Fig. 2, the particle size of the sand is less than the vertical distance between the bottom of hopper 1 and plate 6. While the arm 8 is turned from its full-line position of Fig. 3 to its broken-line position of Fig. 3, the rod or shaft 2 is turned around the common axis of the end-portions 2a, so that the device E acts like a crank or eccentric, thus raising the hopper 1 from its bottom full-line position of Fig. 3. When the arm 8 is in its broken-line position of Fig. 3, the hopper 1 is in its top broken-line position of Fig. 3. There is a vertical distance S between the top broken-line position of the hopper 1 in Fig. 3 and its bottom full-line position in Fig. 3. The hopper 1 can thus be adjusted vertically relative to plate 6 through a distance whose maximum height is S. The full-line position of hopper 1 in Fig. 3 is designated as the non-dispensing position of the hopper 1. By vertically raising the hopper 1 through a selected distance whose maximum height is S, the hopper 1 is moved to its dispensing position. The volume of the material which is dispensed through the oscillation of the hopper 1 depends upon the height of this open bottom from the plate 6. This plate 6 is optionally and preferably imperforate and it is fixed to vehicle-frame F. Said plate 6 is rectangular in this embodiment and it has parallel longitudinal edges, a front lateral edge 6a and a rear lateral edge 6b. Its width, as measured in a lateral direction, is greater than the width of the rectangular bottom opening of hopper 1. The length of plate 6 is greater than the length of the bottom opening of hopper 1. The bottom of hopper 1 also has longitudinal side edges and lateral front and rear edges. The hopper 1 is located between respective longitudinal and parallel bars of frame F, which are close to the parallel and vertical and planar longitudinal side-walls 3 and 4 and with which said side-walls 3 and 4 may have a close sliding fit.

Hence little or no material M flows over the longitudinal edges of plate 6.

Hence, all or substantially all the material M is optionally and preferably dispensed as laterally disposed front and rear streams Ma, which are dispensed alternately over the front and rear lateral edges 6a and 6b.

As shown in Fig. 2, when the hopper 1 is in its extreme forward broken-line inclined position and in its extreme rearward full-line inclined position, the open bottom of the hopper is vertically alined with plate 6, and the lateral edges of the open bottom of the hopper are located laterally inwardly of the lateral edges 6a and 6b. Therefore, even when hopper 1 is in its full-line position of Fig. 2, as one example, the static friction of the particles or pieces of said or other material is sufficient to prevent the material M from flowing out of hopper 1 under the force of gravity alone. Also, said static friction prevents the mass of material which is located between plate 6 and the open bottom of hopper 1, from flowing laterally out of the space between said plate and said open bottom.

Thus, if the hopper 1 is held in either inclined position of Fig. 2, and the vehicle is held stationary, little or no material M will flow out of hopper 1. The lateral streams Ma are produced either wholly or mainly by the sharp reversal of oscillating movement of hopper 1, said movement providing an ejecting force which supplements the force of gravity.

Lateral plates 6d and 6c, which are inclined as shown in Fig. 2, are fixed to bars Fd of vehicle frame F, in order to deflect said streams Ma vertically downwardly through respective open parts of vehicle-frame F, so that each lateral stream Ma is unobstructed and falls on the road or sidewalk or other area in the form of a continuous lateral stream, which spreads longitudinally on the road or sidewalk or other area to be covered.

Optionally and preferably, the oscillating hopper 1 does not strike plate 6 or the guide-plates 6d and 6c, during the oscillating movement of hopper 1.

While the plate 6 may optionally be perforated, it is preferred to use an imperforate plate 6, in order to distribute the material only in the form of alternate and longitudinally spaced lateral streams Ma.

By selecting the frequency of oscillation of hopper 1 relative to the longitudinal speed of the vehicle, and the vertical spacing between the open bottom of the hopper and plate 6, the alternate streams Ma provide a continuous layer of substantially uniform and selected thickness of the material M on the road, sidewalk or other area.

In order to maintain the hopper 1 in vertically adjusted position relative to plate 6, wall 3 is provided with an arcuate flange 9 which has notches 10. The rod 8 can be releasably latched to flange 9 at a selected notch 10. This can be done by using a flexible bar 8, or by providing the respective eccentric E with a limited sliding movement on the respective extension 2b, as by means of an ordinary key and recess. Also, bar 8 may be provided with the usual turnable lug to releasably engage a selected notch 10.

The direction of oscillation of hopper 1 is optionally sharply reversed at the end of each oscillatory movement, in order to agitate and dispense the material M.

The hopper 1 may be oscillated by hand, or by the motor of a motor driven vehicle, or by any means.

As one illustration, sprocket 20, which is fixed to lateral axle 19, is connected by endless chain 21 to sprocket 23, which is fixed to lateral shaft 27, which is mounted turnably in bearings of bars Fd of frame F. A bevel gear 28, which is fixed to shaft 27, meshes with a bevel gear 29 which is fixed to a longitudinal shaft 30. A pulley 11, which is fixed to shaft 30, is connected by endless belt 14, to a pulley 12 which is fixed to the inlet shaft of a conventional speed-change drive, not illustrated, which is located in casing 15. Said speed-change drive has an outlet lateral shaft 16a, which is thus rotated at any selected angular velocity relative to the angular velocity of the main driving shaft or axle 19. Shaft 16a may have a greater or less angular velocity than main driving shaft 19.

Shaft 16a has a conventional crank 16, which is provided with a crank arm 17 which is pivotally connected at 17a to lugs which are fixed rigidly to the front lateral wall of hopper 1.

The oscillation of hopper 1 by crank arm 17 may be stopped when desired, by any conventional disengaging means which are used to disconnect the drive.

Thus, belt 14 may be normally loose on pulleys 12 and 11, so that pulley 11 may be rotated without rotating pulley 12.

A tension roll 23a is turnably mounted at one end of an arm 24, which is pivotally connected by pivot pin 25 to an arm which is fixed to frame F.

Figure 1:
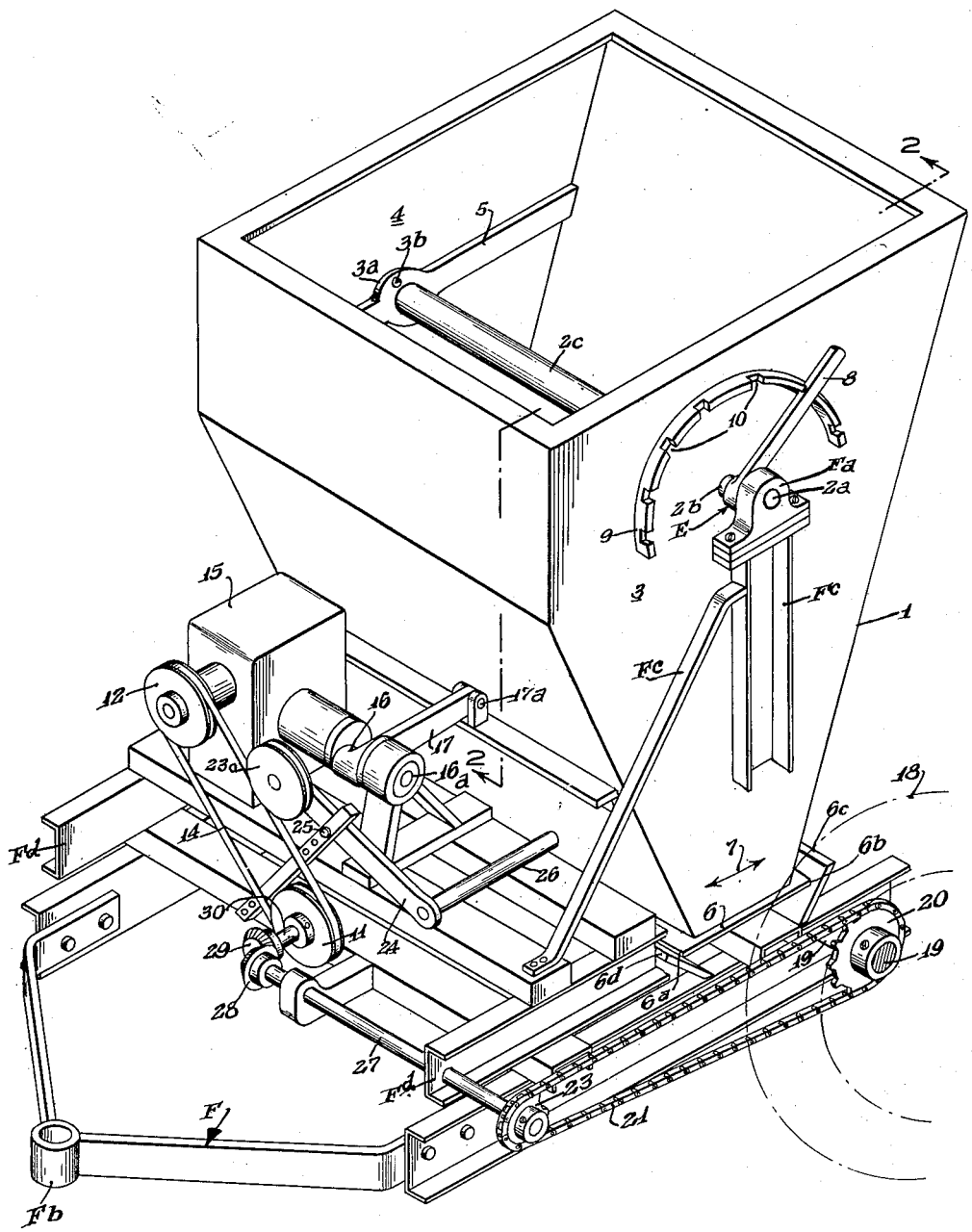
Fig. 1 is a perspective view of the essential parts of the improved device.
Figure 2:
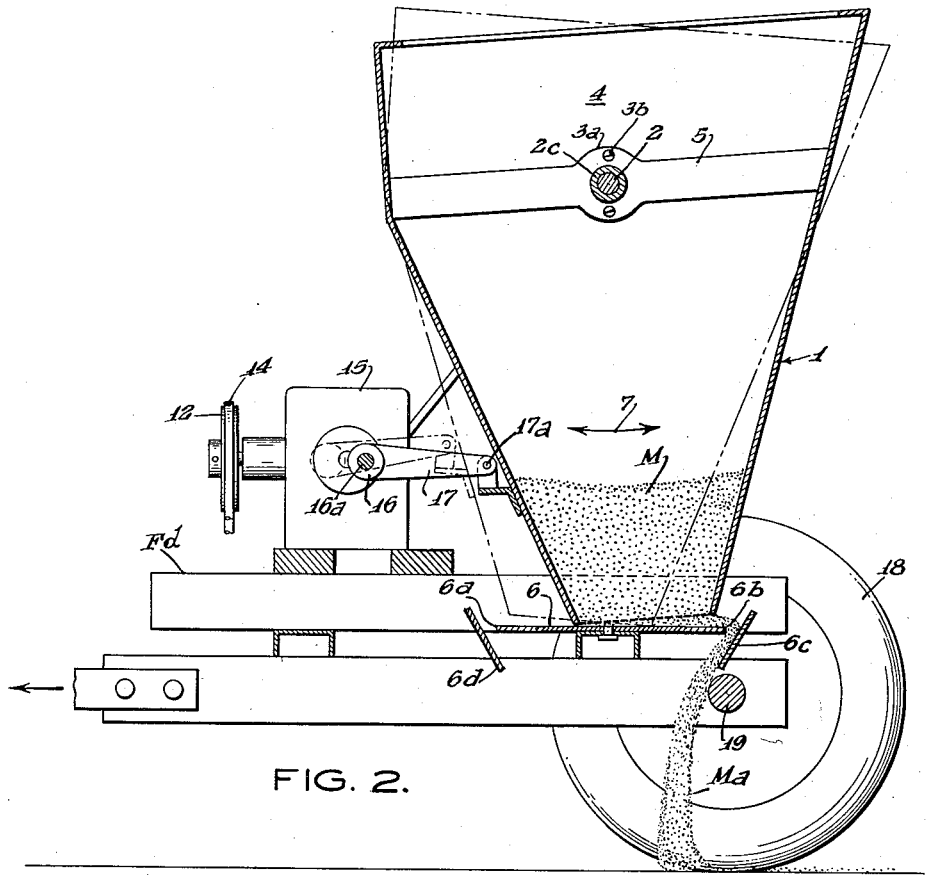
Fig. 2 is a section on the line 2—2 of Fig. 1, showing the hopper in respective extreme inclined positions in full lines and in broken lines.

The weight of tension roll 23a is sufficient to maintain belt 14 taut when tension roll 23a is in its position of Fig. 1. The arm 24 can be turned manually by means of handle 26, which is fixed to arm 24, in order to move tension roll 23a out of contact with belt 14, thus stopping the oscillation of hopper 1.

The operation of the device is as follows:

When no distribution of material M from hopper 1 is desired, said hopper 1 is maintained in its bottom, full-line position of Fig. 3 and the tension roll 23a is held out of contact with belt 14, so that the trailer can be pulled to the desired location while the bottom opening of hopper 1 is closed or obstructed.

At the desired location, the handle 8 is turned in order to raise the hopper 1 relative to plate 6. The vertical distance of hopper 1 relative to plate 6 is one factor which regulates the volume of material which is dispensed in each stream Ma. The drive is then engaged, and the vehicle is pulled while hopper 1 is oscillated at any selected frequency. This frequency of oscillation is controlled by the adjustment of the drive means in casing 15. For convenience, the space between the open bottom of hopper and the plate 6 is designated as an outflow zone.

If the vehicle is motor-driven, the main drive shaft of the dispensing apparatus can be connected by a conventional clutch and speed-change means to a shaft which is rotated by the motor of the vehicle.

I have described a preferred embodiment of my invention but numerous changes and omissions and substitutions can be made without departing from its scope. Thus, the hopper and the means for actuating the same may be mounted on a fixed support, instead of on a moving vehicle.

I claim:

1. Apparatus for distributing selected solid and flowable material in particle form, comprising a frame, a longitudinally and laterally extending plate mounted upon said frame so as to be substantially horizontal, a hopper having an open bottom of smaller area than the area of said plate, means mounting said hopper on said frame so that said hopper is positioned above said plate and is generally upright with said open bottom spaced above said plate to provide an intermediate vertical space which is greater than the particle size of said material and so that said hopper is longitudinally reversibly movable between selected limits, the edges of said open bottom being adapted to be always located inwardly of the edges of said plate during movement of said hopper, said plate in any poistion of said hopper being sufficiently close to said open bottom to hold a mass of said material fed into said hopper above said bottom opening substantially stationary in said intermediate space by the internal friction of said material alone against the force of gravity alone when said hopper is stationary relative to said plate, and actuating means for moving said hopper reversibly between its limits of movement, the movement of said hopper at the reversals of said movement supplying an ejecting force to said material at each said reversal, the sum of the force of gravity and said ejecting force exceeding the internal friction of said material, whereby a stream of said material is ejected longitudinally out of said intermediate space corresponding to each reversal of hopper movement.

2. Apparatus for distributing selected solid and flowable material in particle form, comprising a frame, a longitudinally and laterally extending plate mounted upon said frame so as to be substantially horizontal, a hopper having an open bottom of smaller area than the area of said plate, means mounting said hopper on said frame so that said hopper is positioned above said plate and is generally upright with said open bottom spaced above said plate to provide an intermediate vertical space which is greater than the particle size of said material and so that said hopper is reversibly turnable about a lateral pivot axis through its vertical position between selected limits, the edges of said open bottom being adapted to be always located inwardly of the edges of said plate during movement of said hopper, said plate in any position of said hopper being sufficiently close to said open bottom to hold a mass of said material fed into said hopper above said bottom opening substantially stationary in said intermediate space by the internal friction of said material alone against the force of gravity alone when said hopper is stationary relative to said plate, and actuating means for moving said hopper reversibly between its limits of movement, the movement of said hopper at the reversals of said movement supplying an ejecting force to said material at each said reversal, the sum of the force of gravity and said ejecting force exceeding the internal friction of said material, whereby a stream of said material is ejected longitudinally out of said intermediate space corresponding to each reversal of hopper movement.

3. Apparatus for distributing selected solid and flowable material in particle form upon a surface, comprising a vehicle, means for propelling said vehicle upon said surface, a longitudinally and laterally extending plate mounted upon said vehicle so as to be substantially horizontal when said surface is substantially horizontal, a hopper having an open bottom of smaller area than the area of said plate, means mounting said hopper on said vehicle so that said hopper is positioned above said plate and is generally upright when said surface is substantially horizontal with said open bottom spaced above said plate to provide an intermediate vertical space which is greater than the particle size of said material and so that said hopper is longitudinally reversibly movable between selected limits, the edges of said open bottom being adapted to be always located inwardly of the edges of said plate during movement of said hopper, said plate in any position of said hopper being sufficiently close to said open bottom to hold a mass of said material fed into said hopper above said bottom opening substantially stationary in said intermediate space by the internal friction of said material alone against the force of gravity alone when said hopper is stationary relative to said plate, and actuating means for moving said hopper reversibly between its limits of movement, the movement of said hopper at the reversals of said movement supplying an ejecting force to said material at each said reversal, the sum of the force of gravity and said ejecting force exceeding the internal friction of said material, whereby a stream of said material is ejected longitudinally out of said intermediate space alternately in opposite directions corresponding to each reversal of hopper movement, the frequency of said reversal having a selected ratio to the velocity of movement of said vehicle, whereby said material is spread evenly over said surface.

4. Apparatus for distributing selected solid and flowable material in particle form upon a surface, comprising a vehicle, means for propelling said vehicle upon said surface, a longitudinally and laterally extending plate mounted upon said vehicle so as to be substantially horizontal when said surface is substantially horizontal, a hopper having an open bottom of smaller area than the area of said plate, means mounting said hopper on said vehicle so that said hopper is positioned above said plate and is generally upright when said surface is substantially horizontal with said open bottom spaced above said plate to provide an intermediate vertical space which is greater than the particle size of said material and so that said hopper is reversibly turnable about a lateral pivot axis through its vertical position between selected limits, the edges of said open bottom being adapted to be always located inwardly of the edges of said plate during movement of said hopper, said plate in any position of said hopper being sufficiently close to said open bottom to hold a mass of said material fed into said hopper above said bottom opening substantially stationary in said intermediate space by the internal friction of said material alone against the force of gravity alone when said hopper is stationary relative to said plate, and actuating means for moving said hopper reversibly between its limits of movement, the movement of said hopper at the reversals of said movement supplying an ejecting force to said material at each said reversal, the sum of the force of gravity and said ejecting force exceeding the internal friction of said material, whereby a stream of said material is ejected longitudinally out of said intermediate space alternately in opposite directions corresponding to each reversal of hopper movement, the frequency of said reversal having a selected ratio to the velocity of movement of said vehicle, whereby said material is spread evenly over said surface.

References Cited in the file of this patent

UNITED STATES PATENTS

| Number | Name | Date |
| --- | --- | --- |
| 228,609 | Coleman | June 8, 1880 |
| 266,157 | Hurt et al. | Oct. 17, 1882 |
| 977,290 | Frennet | Nov. 29, 1910 |
| 1,068,340 | Hennessee | July 22, 1913 |
| 2,104,930 | Mackintosh | Jan. 11, 1938 |

FOREIGN PATENTS

| Number | Country | Date |
| --- | --- | --- |
| 77,772 | Germany | Nov. 3, 1894 |
| 516,494 | Germany | Jan. 23, 1931 |